United States Patent Office.

ADOLF ISRAEL AND RICHARD KOTHE, OF ELBERFELD, GERMANY, ASSIGNORS TO FARBENFABRIKEN OF ELBERFELD CO., OF NEW YORK, N. Y.

THIO-UREA COMPOUND AND PROCESS OF MAKING SAME.

SPECIFICATION forming part of Letters Patent No. 675,631, dated June 4, 1901.

Application filed December 31, 1900. Serial No. 41,623. (No specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Thio-Urea Compounds and Processes of Making Same; and we hereby declare the following to be a clear and exact description of our invention.

Our invention relates to the production of a new thio-urea compound derived from amidonaphthol sulfonic acids, being an alkaline salt of an acid having the following formula:

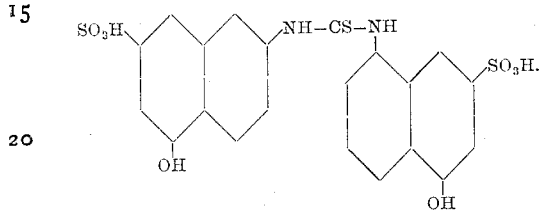

The process for producing this body consists in heating an equimolecular mixture of $beta_1$-amido-$alpha_3$-naphthol-$beta_4$-sulfonic acid and $alpha_1$-amido-$alpha_3$-naphthol-$beta_4$-sulfonic acid with carbon bisulfid ($CS_2$) and sulfur in a neutral or slightly-alkaline solution. A condensation of the two above-named amidonaphthol sulfonic acids with one molecule of carbon bisulfid takes place under evolution of one molecule of sulfureted hydrogen, the above-defined thio-urea derivative being thus formed according to the following equation:

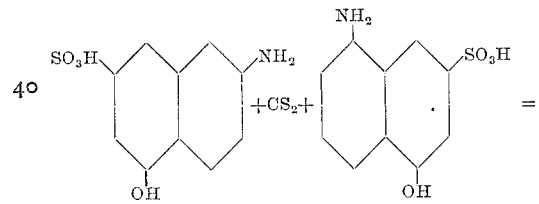

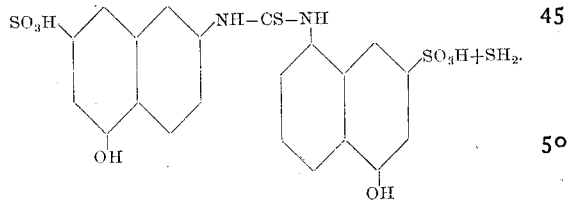

The new thio-urea derivative thus obtained may be employed for the manufacture of valuable azo dyestuffs.

In carrying out our new process practically we can proceed as follows, the parts being by weight: To a solution of twelve parts of $beta_1$-amido-$alpha_3$-naphthol-$beta_4$-sulfonic acid and twelve parts of $alpha_1$-amido-$alpha_3$-naphthol-$beta_4$-sulfonic acid in about from two hundred to three hundred parts of water, to which so much sodium carbonate has been added as to render it slightly alkaline, we add two hundred to three hundred parts of ethylic alcohol, from twenty to twenty-five parts of carbon bisulfid, and from 0.4 to 0.5 parts of powdered sulfur. The mixture thus obtained is boiled in a vessel provided with a reflux-condenser until the evolution of sulfureted hydrogen ceases. After the alcohol and the superfluous carbon bisulfid have been distilled off the reaction mixture is filtered in order to remove the sulfur which has been precipitated. The filtrate is then acidulated by means of hydrochloric acid and the thio-urea derivative is precipitated from the acid solution by the addition of common salt. For further purification it is extracted with water, filtered, and then precipitated again by the addition of common salt. The pure sodium salt of the new body thus obtained crystallizes from water containing common salt in the shape of whitish flakes, which are readily soluble in cold and very readily in hot water and soluble with difficulty in alcohol. The barium salt represents a grayish powder which is soluble in cold and readily soluble in hot water. The calcium salt is a grayish powder which is very readily soluble in hot and less soluble in cold water. These salts are prepared by the addition of solutions of barium chlorid ($BaCl_2$) or of calcium chlorid ($CaCl_2$) to watery solutions of the sodium salt of the said thio-urea derivative. On boiling the thiourea derivative with the twentyfold quantity of hydrochloric acid of twenty per cent. it dissolves, and after boiling for some time $beta_1$-amido-$alpha_3$-naphthol-$beta_4$-sulfonic acid and $alpha_1$-amido-$alpha_3$-naphthol-$beta_4$-sulfonic acid are regenerated. The new thiourea derivative is capable of combining with one and likewise with two molecules of diazo compounds, thus furnishing valuable azo dyestuffs.

Having now described our invention and in what manner the same is to be performed, what we claim as new, and desire to secure by Letters Patent, is—

1. The process for producing a new thiourea derivative of amidonaphthol sulfonic acids by first dissolving an equimolecular mixture of $beta_1$-amido-$alpha_3$-naphthol-$beta_4$-sulfonic acid and $alpha_1$-amido-$alpha_3$-naphthol-$beta_4$-sulfonic acid in water with the addition of sodium carbonate, secondly heating this solution after the addition of carbon bisulfid, sulfur and alcohol and finally isolating the resulting thio-urea derivative, substantially as hereinbefore described.

2. The herein-described new thio-urea derivative which in the form of the free acid has the following formula:

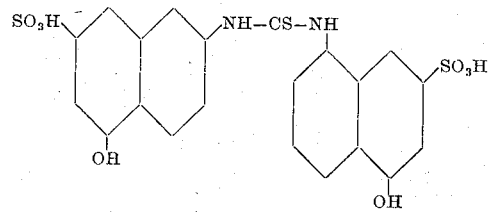

and in the form of the sodium salt consists of whitish flakes, being capable of combining with one and likewise with two molecules of diazo compounds, being readily soluble in cold, very readily soluble in hot water, and which on boiling with the twentyfold quantity of hydrochloric acid of twenty per cent. dissolves and after some time $beta_1$-amido-$alpha_3$-naphthol-$beta_4$-sulfonic acid and $alpha_1$-amido-$alpha_3$-naphthol-$beta_4$-sulfonic acid are regenerated, substantially as hereinbefore described.

In testimony whereof we have signed our names in the presence of two subscribing witnesses.

ADOLF ISRAEL.
RICHARD KOTHE.

Witnesses:
OTTO KÖNIG,
J. A. RITTERSHAUS.